US009178689B2

(12) United States Patent
Yu (10) Patent No.: US 9,178,689 B2
(45) Date of Patent: Nov. 3, 2015

(54) MULTIMODE BASE STATION AND IMPLEMENTATION METHOD THEREOF

(71) Applicant: HUAWEI TECHNOLOGIES CO., LTD., Shenzhen, Guangdong (CN)

(72) Inventor: Weidong Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/581,033

(22) Filed: Dec. 23, 2014

(65) Prior Publication Data

US 2015/0110234 A1    Apr. 23, 2015

Related U.S. Application Data

(63) Continuation of application No. PCT/CN2013/078286, filed on Jun. 28, 2013.

(30) Foreign Application Priority Data

Jun. 28, 2012   (CN) .......................... 2012 1 0218385

(51) Int. Cl.
| | |
|---|---|
| *H03D 3/24* | (2006.01) |
| *H04L 7/033* | (2006.01) |
| *H04B 1/403* | (2015.01) |
| *H04W 88/10* | (2009.01) |

(52) U.S. Cl.
CPC .............. *H04L 7/0331* (2013.01); *H04B 1/406* (2013.01); *H04W 88/10* (2013.01)

(58) Field of Classification Search
CPC ...... H04L 7/0331; H04B 1/406; H04W 88/10
See application file for complete search history.

(56) References Cited

U.S. PATENT DOCUMENTS

| | | | |
|---|---|---|---|
| 9,001,951 B1 * | 4/2015 | Kumpulainen | ................ 375/371 |
| 2008/0318631 A1 * | 12/2008 | Baldwin et al. | ............. 455/562.1 |
| 2013/0107808 A1 * | 5/2013 | He et al. | ......................... 370/328 |

FOREIGN PATENT DOCUMENTS

| | | |
|---|---|---|
| CN | 102201910 | 9/2011 |
| CN | 102215559 | 10/2011 |
| CN | 102404105 | 4/2012 |
| CN | 102448199 | 5/2012 |
| CN | 102781090 | 11/2012 |
| WO | 2009/135160 A2 | 11/2009 |

OTHER PUBLICATIONS

International Search Report mailed Oct. 3, 2013 in corresponding International Application No. PCT/CN2013/078286.
PCT International Search Report dated Oct. 3, 2013 in corresponding International Patent Application No. PCT/CN2013/078286.
Extended European Search Report dated May 12, 2015 in corresponding European Patent Application No. 13808648.3.

* cited by examiner

*Primary Examiner* — Erin File
(74) *Attorney, Agent, or Firm* — Staas & Halsey LLP (57) ABSTRACT

The present invention relates to a method includes: implementing, by the board in the BBU1, frequency synchronization between a system clock of the board in the BBU1 and a system clock of the board in the BBU0 by using a synchronous Ethernet clock that is output by the board in the BBU0; and implementing, by the board in the BBU1, time synchronization between the system clock of the board in the BBU1 and the system clock of the board in the BBU0 by using an IEEE1588 clock that is output by the board in the BBU0. The present invention can enable the multimode base station to support more standards.

15 Claims, 5 Drawing Sheets

FIG. 1

```
┌─────────────────────────────────────────────────────────────┐
│ A board in a BBU1 implements frequency synchronization between a │ 201
│ system clock of the board in the BBU1 and a system clock of a board in a │
│ BBU0 by using a synchronous Ethernet clock that is output by the board │
│                        in the BBU0                          │
└─────────────────────────────────────────────────────────────┘
                              │
                              ▼
┌─────────────────────────────────────────────────────────────┐
│ The board in the BBU1 implements time synchronization between the │ 202
│ system clock of the board in the BBU1 and the system clock of the board │
│ in the BBU0 by using an IEEE1588 clock that is output by the board in │
│                        the BBU0                             │
└─────────────────────────────────────────────────────────────┘
```

MULTIMODE BASE STATION AND IMPLEMENTATION METHOD THEREOF

CROSS-REFERENCE TO RELATED APPLICATION

This application is continuation of International Application No. PCT/CN2013/078286, filed on Jun. 28, 2013, which claims priority to Chinese Patent Application No. 201210218385.X, filed on Jun. 28, 2012, both of which are hereby incorporated by reference in their entireties.

TECHNICAL FIELD

The present invention relates to the field of communications technologies, and in particular, to a multimode base station and an implementation method thereof.

BACKGROUND

A multimode base station refers to a base station that can simultaneously support multiple wireless standards. A common base station that can support both a Global System for Mobile communications (Global System for Mobile communications, GSM) standard and a Universal Mobile Telecommunications System (Universal Mobile Telecommunications System, UMTS) standard is called a GU dual-mode base station, a base station that can support both a GSM standard and a Long Term Evolution (Long Term Evolution, LTE) standard is called a GL dual-mode base station, and a base station that can support both a UMTS standard and an LTE standard is called a UL dual-mode base station.

Figure 1:
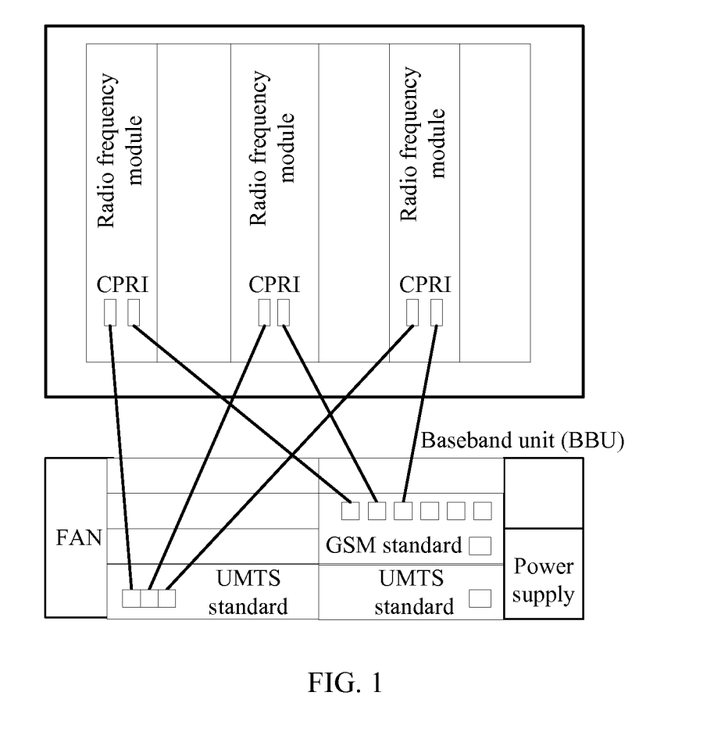
FIG. 1 is a schematic structural diagram of a GU dual-mode macro base station in the prior art.

In an actual application, main control boards of different standards are generally overlaid in a baseband unit (Base Band Unit, BBU) to form a multimode base station. Using a GU dual-mode macro base station shown in FIG. 1 as an example, a board of the GSM standard and a board of the UMTS standard may be overlaid in a single BBU, where the board of the GSM standard and the board of the UMTS standard each are connected to a common-mode radio frequency module through a common public radio interface (Common Public Radio Interface, CPRI), so as to form a GU dual-mode base station.

It is found in practice that because slots supported by a single BBU are limited, standards supported by the single BBU are limited. Generally, a single BBU can support only two boards, and therefore, a multimode base station supports few standards.

SUMMARY

Embodiments of the present invention provide a multimode base station and an implementation method thereof, which can enable the multimode base station to support more standards.

According to one aspect, an embodiment of the present invention provides an implementation method of a multimode base station, where the multimode base station is at least integrated with a first baseband unit BBU0 and a second base band unit BBU1, where a board of at least one standard is overlaid in the BBU0 and the BBU1 each; and the board in the BBU0 and the board in the BBU1 each are connected to a common-mode radio frequency module through a common public radio interface, the method including:

implementing, by the board in the BBU1, frequency synchronization between a system clock of the board in the BBU1 and a system clock of the board in the BBU0 by using a synchronous Ethernet clock that is output by the board in the BBU0; and implementing, by the board in the BBU1, time synchronization between the system clock of the board in the BBU1 and the system clock of the board in the BBU0 by using an IEEE1588 clock that is output by the board in the BBU0.

According another aspect, an embodiment of the present invention provides a multimode base station, where the multimode base station is at least integrated with a first baseband unit BBU0 and a second base band unit BBU1, where a board of at least one standard is overlaid in the BBU0 and the BBU1 each; and the board in the BBU0 and the board in the BBU1 each are connected to a common-mode radio frequency module through a common public radio interface, where:

the board in the BBU0 is configured to output a synchronous Ethernet clock and an IEEE1588 clock to the board in the BBU1; and the board in the BBU1 is configured to implement frequency synchronization between a system clock of the board in the BBU1 and a system clock of the board in the BBU0 by using the synchronous Ethernet clock that is output by the board in the BBU0, and implement time synchronization between the system clock of the board in the BBU1 and the system clock of the board in the BBU0 by using the IEEE1588 clock that is output by the board in the BBU0.

In the embodiments of the present invention, a multimode base station is at least integrated with a first baseband unit BBU0 and a second base band unit BBU1, and because a board in the BBU0 and a board in the BBU1 each are connected to a common-mode radio frequency module through a CPRI, the board in the BBU1 can implement frequency synchronization between a system clock of the board in the BBU1 and a system clock of the board in the BBU0 by using a synchronous Ethernet clock that is output by the board in the BBU0, and the board in the BBU1 can implement time synchronization between the system clock of the board in the BBU1 and the system clock of the board in the BBU0 by using an IEEE1588 clock that is output by the board in the BBU0, thereby implementing strict synchronization between the system clock of the board in the BBU0 and the system clock of the board in the BBU1 and enabling the multimode base station to support more standards.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention provide a multimode base station and an implementation method thereof, which can enable the multimode base station to support more standards. The multimode base station provided by the embodiments of the present invention may support a combination of various standards such as a GSM standard, a UMTS standard, a Code Division Multiple Access (Code Division Multiple Access, CDMA) standard, a Worldwide Interoperability for Microwave Access (Worldwide Interoperability for Microwave Access, WIMAX) standard, and an LTE standard. For example, the GSM standard, the UMTS standard, and the LTE standard may be combined to a GUL triple-mode base station; the CDMA standard, the WIMAX standard, and the LTE standard may be combined to a CWL triple-mode base station, and the like. The embodiments of the present invention are not only applicable to a multimode macro base station, but also applicable to a distributed multimode base station. The following describes the embodiments of the present invention in detail.

Figure 2:
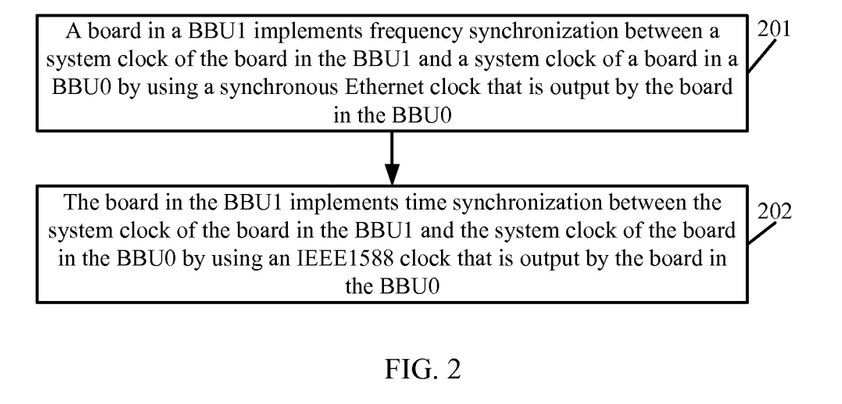
FIG. 2 is a schematic flowchart of an implementation method of a multimode base station according to a first embodiment of the present invention.

Referring to FIG. 2, FIG. 2 is a schematic flowchart of an implementation method of a multimode base station according to a first embodiment of the present invention. In the implementation method of the multimode base station shown in FIG. 2, the multimode base station is at least integrated with a first baseband unit BBU0 and a second base band unit BBU1, where a board of at least one standard is overlaid in the BBU0 and the BBU1 each; and the board in the BBU0 and the board in the BBU1 each are connected to a common-mode radio frequency module (for example, a radio frequency module of a 900 MHz frequency band) through a CPRI. As shown in FIG. 2, the implementation method of the multimode base station may include the following steps:

201. The board in the BBU1 implements frequency synchronization between a system clock of the board in the BBU1 and a system clock of the board in the BBU0 by using a synchronous Ethernet clock that is output by the board in the BBU0.

202. The board in the BBU1 implements time synchronization between the system clock of the board in the BBU1 and the system clock of the board in the BBU0 by using an IEEE1588 clock that is output by the board in the BBU0.

A sequence of step 201 and step 202 is not limited in the embodiment of the present invention.

In the embodiment of the present invention, a standard of the board in the BBU0 may be completely different from a standard of the board in the BBU1, so that the multimode base station can implement more different standards. For example, the standard of the board in the BBU0 may include a GSM standard and a UMTS standard, and the standard of the board in the BBU1 may include an LTE standard, so as to form a GUL triple-mode macro base station shown in FIG. 3, or form a distributed GUL triple-mode base station shown in FIG. 4. For another example, the standard of the board in the BBU0 may include a CDMA standard and a WIMAX standard, and the standard of the board in the BBU1 may include the LTE standard, so as to form a CWL triple-mode base station. For still another example, the standard of the board in the BBU0 may include the GSM standard and the UMTS standard, and the standard of the board in the BBU1 may include the CDMA standard and the WIMAX standard, so as to form a GUCW quadruple-mode base station.

Certainly, in the embodiment of the present invention, the standard of the board in the BBU0 may be partially the same as the standard of the board in the BBU1, so that the multimode base station has backup of partial standards. For example, the standard of the board in the BBU0 may include the GSM standard and the UMTS standard, and the standard of the board in the BBU1 may include the LTE standard and the UMTS standard, so as to form a GUL triple-mode base station. In this case, the UMTS standard included in the board in the BBU0 may function as an active standard while the UMTS standard included in the board in the BBU1 may function as a standby standard. In a normal case, the UMTS standard included in the board in the BBU0 may provide an external service; when the UMTS standard included in the board in the BBU0 becomes faulty, the UMTS standard included in the board in the BBU1 may be enabled to function as the active standard and provide the external service.

As an optional implementation manner, the implementation method of the multimode base station shown in FIG. 2 may further include the following steps:

1) A frequency division phase detector of the board in the BBU0 receives a reference clock signal input by an external clock source, and inputs the reference clock signal into an oven controlled crystal oscillator (Oven Controlled Crystal Oscillator, OCXO) of the board in the BBU0.

2) The OCXO of the board in the BBU0 outputs a first clock to a voltage-controlled crystal oscillator (Voltage-controlled Crystal Oscillator, VCXO) of the board in the BBU0; and the VCXO of the board in the BBU0 outputs a second clock to a frequency division phase locker of the board in the BBU0, where precision of the second clock is higher than that of the first clock.

Generally, the first clock output by the OCXO of the board in the BBU0 may be 10 MHz or 13 MHz, while the second clock output by the VCXO of the board in the BBU0 may be 122.88 MHz.

3) The frequency division phase locker of the board in the BBU0 outputs a system clock and phase information of the BBU0.

4) The OCXO of the board in the BBU0 outputs the first clock to a phase-locked loop of a synchronous Ethernet clock of the board in the BBU0, where the phase-locked loop of the synchronous Ethernet clock outputs the synchronous Ethernet clock and transmits the synchronous Ethernet clock to the board in the BBU1 through an interface chip of the board in the BBU0.

Generally, the synchronous Ethernet clock output by the phase-locked loop of the synchronous Ethernet clock is 25 MHz.

5) After performing phase lock processing on the phase information of the BBU0, a phase-locked loop of an IEEE 1588 clock of the board in the BBU0 outputs the phase information of the BBU0 to an IEEE1588 boundary clock (BC) of the board in the BBU0; and the IEEE1588 BC outputs an IEEE1588 clock packet and transmits the IEEE1588 clock packet to the board in the BBU1 through the interface chip of the board in the BBU0.

Correspondingly, in step 201, that the board in the BBU1 implements frequency synchronization between a system clock of the board in the BBU1 and a system clock of the board in the BBU0 by using a synchronous Ethernet clock that is output by the board in the BBU0 may specifically include the following steps:

1) An interface chip of the board in the BBU1 receives the synchronous Ethernet clock transmitted by the interface chip of the board in the BBU0, and outputs the synchronous Ethernet clock to a VCXO of the board in the BBU1; and the VCXO of the board in the BBU1 outputs the second clock to a frequency division phase locker of the board in the BBU1.

2) The frequency division phase locker of the board in the BBU1 outputs a system clock and phase information of the BBU1, so as to implement frequency synchronization between the system clock of the BBU1 and the system clock of the BBU0.

Correspondingly, in step 202, that the board in the BBU1 implements time synchronization between the system clock of the board in the BBU1 and the system clock of the board in the BBU0 by using an IEEE1588 clock that is output by the board in the BBU0 may specifically include the following steps:

1) The interface chip of the board in the BBU1 receives the IEEE1588 clock packet transmitted by the interface chip of the board in the BBU0, and outputs the IEEE1588 clock packet to an IEEE1588 boundary clock of the board in the BBU1.

2) The IEEE1588 boundary clock outputs clock information to a central processing unit (Central Processing Unit, CPU) of the board in the BBU1, and the CPU outputs a time adjusting value to a phase-locked loop of an IEEE 1588 clock of the board in the BBU1.

3) The phase-locked loop of the 1588 clock of the board in the BBU1 outputs clock phase information of the BBU1 to the frequency division phase locker of the board in the BBU1, and the frequency division phase locker of the board in the BBU1 performs locking on a phase of the BBU1, so as to implement time synchronization between the system clock of the BBU1 and the system clock of the BBU0.

Figure 3:
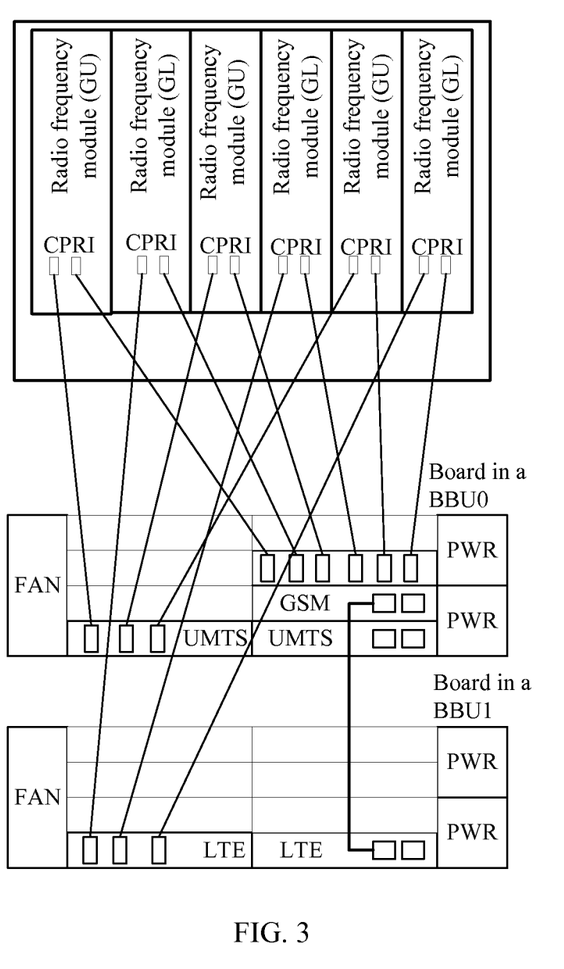
FIG. 3 is a schematic structural diagram of a GUL triple-mode macro base station according to the first embodiment of the present invention.

In the embodiment of the present invention, a board in a BBU0 and a board in a BBU1 of a multimode base station each are connected to a common-mode radio frequency module through a CPRI, so that CPRI links of different standards converge together, and as shown in FIG. 3, the common-mode radio frequency module (GL) has two CPRI cables connected to different standards, respectively. Therefore, strict synchronization must be ensured for system clocks of two standards. However, in the embodiment of the present invention, the board in the BBU1 can implement frequency synchronization between a system clock of the board in the BBU1 and a system clock of the board in the BBU0 by using a synchronous Ethernet clock that is output by the board in the BBU0, and the board in the BBU1 can implement time synchronization between the system clock of the board in the BBU1 and the system clock of the board in the BBU0 by using an IEEE1588 clock that is output by the board in the BBU0, thereby implementing strict synchronization between the system clock of the board in the BBU0 and the system clock of the board in the BBU1 and enabling the multimode base station to support more standards.

Figure 4:
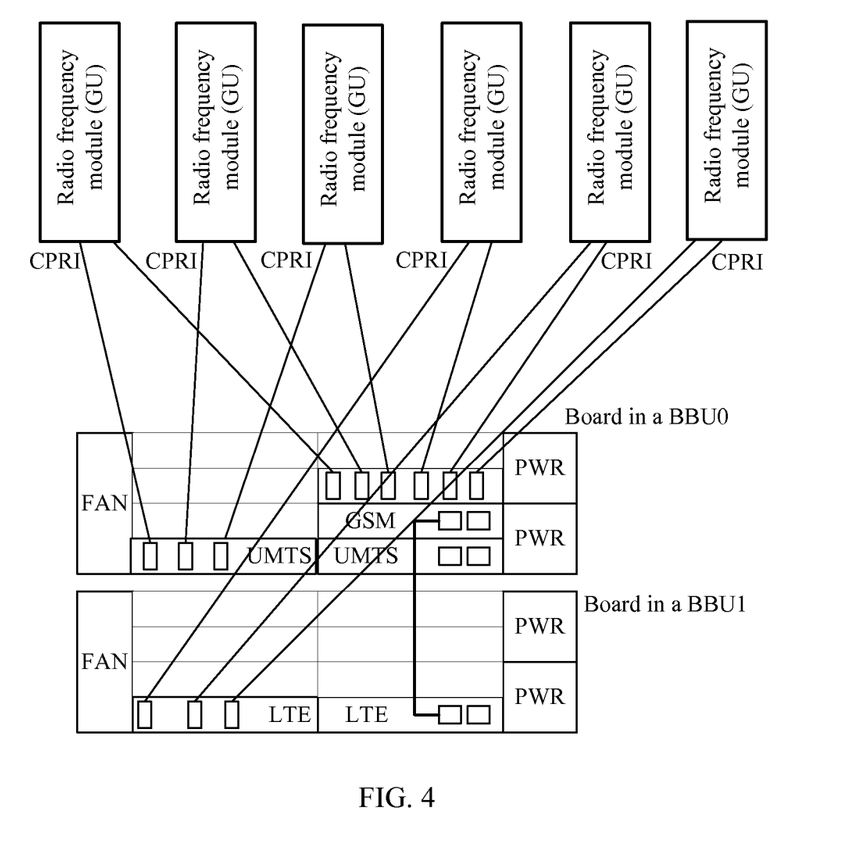
FIG. 4 is a schematic structural diagram of a distributed GUL triple-mode base station according to the first embodiment of the present invention.
Figure 5A:
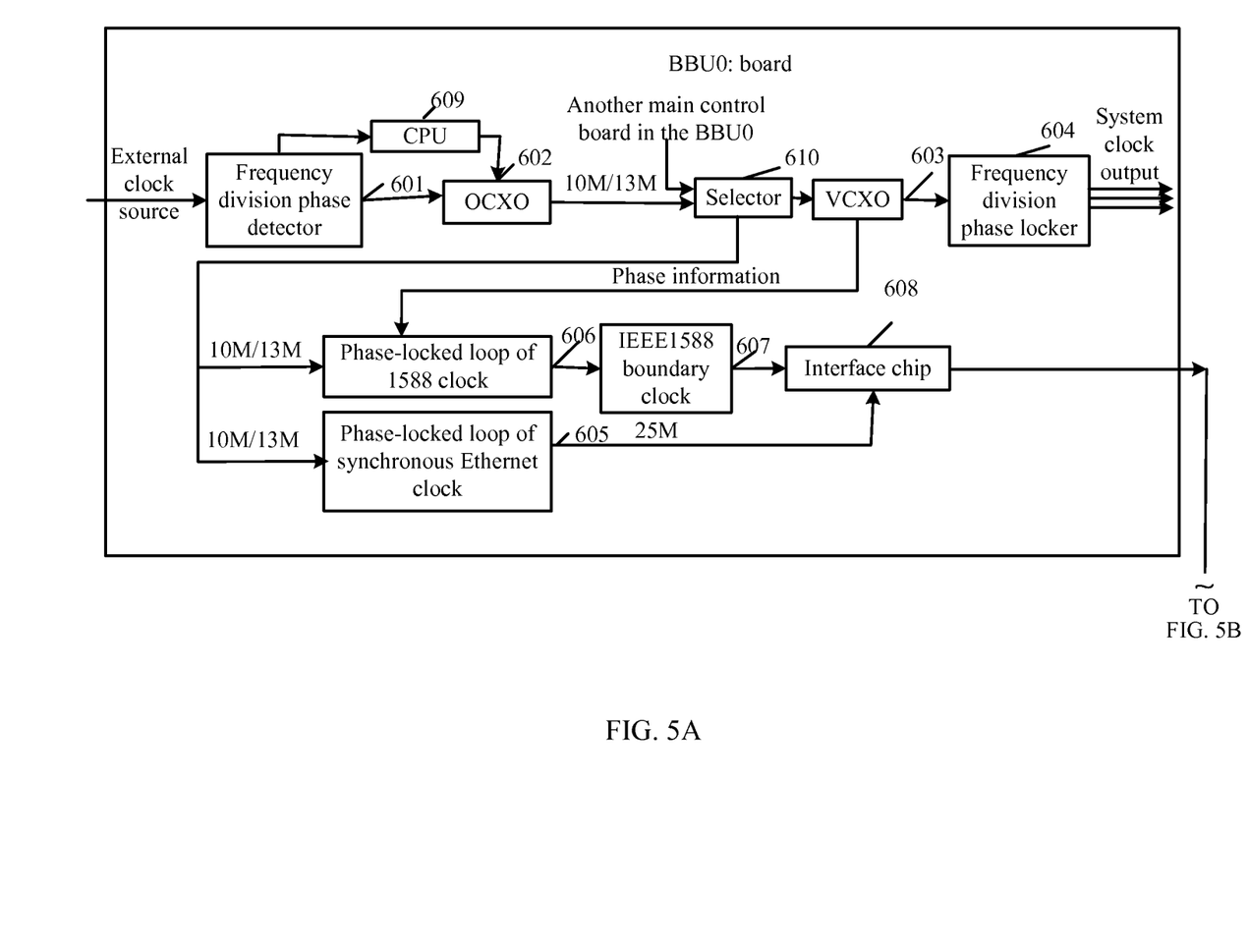
FIG. 5A and FIG. 5B are a schematic structural diagram of interconnection between a board in a BBU0 and a board in a BBU1 according to a second embodiment of the present invention.
Figure 5B:
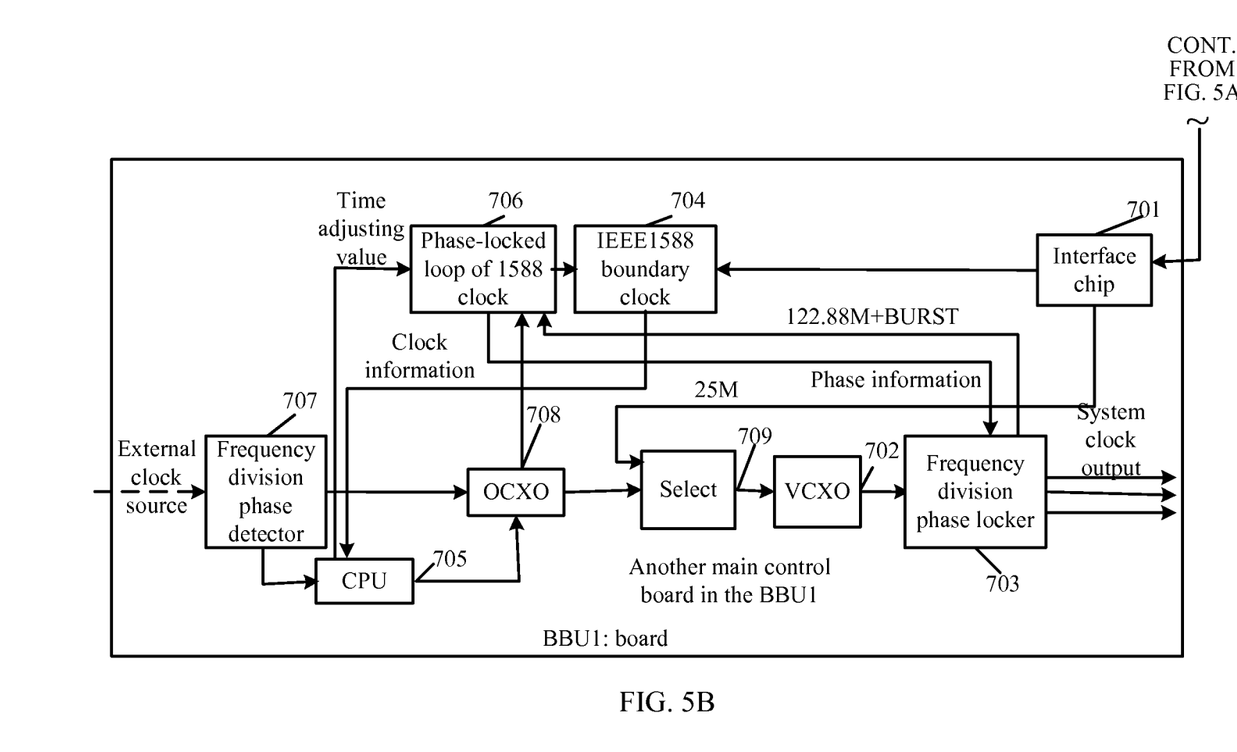

A second embodiment of the present invention provides a multimode base station, where the schematic structural diagram of the multimode base station may be similar to that of the multimode base station as shown in FIG. 3 or FIG. 4. The multimode base station provided by the second embodiment of the present invention is at least integrated with a first baseband unit BBU0 and a second base band unit BBU1, where a board of at least one standard is overlaid in the BBU0 and the BBU1 each; and the board in the BBU0 and the board in the BBU1 each are connected to a common-mode radio frequency module (for example, a radio frequency module of a 900 MHz frequency band) through a CPRI.

The board in the BBU0 is configured to output a synchronous Ethernet clock and an IEEE1588 clock to the board in the BBU1.

The board in the BBU1 is configured to implement frequency synchronization between a system clock of the board in the BBU1 and a system clock of the board in the BBU0 by using the synchronous Ethernet clock that is output by the board in the BBU0, and implement time synchronization between the system clock of the board in the BBU1 and the system clock of the board in the BBU0 by using the IEEE1588 clock that is output by the board in the BBU0.

Also referring to FIG. 6, FIG. 6 is a schematic structural diagram of interconnection between a board in a BBU0 and a board in a BBU1 according to a second embodiment of the present invention. As shown in FIG. 6, the board in the BBU0 at least includes a frequency division phase detector—601, an oven controlled crystal oscillator (OCXO)—602, a voltage-controlled crystal oscillator (VCXO)—603, a frequency division phase locker—604, a phase-locked loop—605 of a synchronous Ethernet clock, a phase-locked loop—606 of an IEEE 1588 clock, an EEE1588 boundary clock—607, and an interface chip—608, where:

the frequency division phase detector—601 of the board in the BBU0 is configured to receive a reference clock signal input by an external clock source, and input the reference clock signal into the oven controlled crystal oscillator (OCXO)—602 of the board in the BBU0;

the oven controlled crystal oscillator—602 of the board in the BBU0 is configured to receive a reference clock signal input by the frequency division phase detector—601 of the board in the BBU0, and output a first clock to the voltage-controlled crystal oscillator—603 of the board in the BBU0;

the voltage-controlled crystal oscillator—603 of the board in the BBU0 is configured to receive the first clock (such as 10 MHz/13 MHz) output by the oven controlled crystal oscillator—602 of the board in the BBU0, and output a second clock (such as 122.88 MHz) to the frequency division phase locker—604 of the board in the BBU0, where precision of the second clock is higher than precision of the first clock;

the frequency division phase locker—604 of the board in the BBU0 is configured to receive the second clock output by the voltage-controlled crystal oscillator—603 of the board in the BBU0, and output a system clock and phase information of the BBU0;

the oven controlled crystal oscillator—602 of the board in the BBU0 is further configured to output the first clock to the phase-locked loop—605 of the synchronous Ethernet clock of the board in the BBU0;

the phase-locked loop—605 of the synchronous Ethernet clock of the board in the BBU0 is configured to receive the first clock output by the oven controlled crystal oscillator—602 of the board in the BBU0, and output a synchronous Ethernet clock (such as 25 MHz) to the interface chip—608 of the board in the BBU0;

the interface chip—608 of the board in the BBU0 is configured to transmit the synchronous Ethernet clock output by the phase-locked loop—605 of the synchronous Ethernet clock of the board in the BBU0 to the board in the BBU1;

the phase-locked loop—606 of the 1588 clock of the board in the BBU0 is configured to perform phase lock processing on the phase information output by the frequency division phase locker—604 of the board in the BBU0 and output the phase information to the IEEE1588 boundary clock—607 of the board in the BBU0;

the IEEE1588 boundary clock—607 of the board in the BBU0 is configured to output an IEEE1588 clock packet to the interface chip—608 of the board in the BBU0; and the interface chip—608 of the board in the BBU0 is further configured to transmit the IEEE1588 clock packet output by the IEEE1588 boundary clock—607 of the board in the BBU0 to the board in the BBU1.

Further, as shown in FIG. 6, the board in the BBU0 may further include a CPU—609 and a selector—610, where the CPU—609 of the board in the BBU0 is configured to receive a reference clock signal input by the frequency division phase detector—601 of the board in the BBU0, and obtain, by calculating, a time adjusting value according to a clock algorithm and input the time adjusting value into the oven controlled crystal oscillator—602 of the board in the BBU0, so that the oven controlled crystal oscillator—602 outputs a first clock to the voltage-controlled crystal oscillator—603 of the board in the BBU0; and the selector—610 is configured to select the first clock output by the oven controlled crystal oscillator—602 of the board in the BBU0 for the voltage-controlled crystal oscillator—603 of the board in the BBU0.

As shown in FIG. 6, the board in the BBU1 at least includes an interface chip—701, a VCXO—702, and a frequency division phase locker—703, where:

the interface chip—701 of the board in the BBU1 is configured to receive a synchronous Ethernet clock transmitted by the interface chip—608 of the board in the BBU0, and output the synchronous Ethernet clock to the VCXO—702 of the board in the BBU1;

the VCXO—702 of the board in the BBU1 is configured to receive the synchronous Ethernet clock output by the interface chip—701 of the board in the BBU1, and output the second clock (such as 122.88 MHz) to the frequency division phase locker—703 of the board in the BBU1; and the frequency division phase locker—703 of the board in the BBU1 is configured to receive the second clock output by the VCXO—702 of the board in the BBU1, and output a system clock and phase information of the BBU1, so as to implement frequency synchronization between the system clock of the BBU1 and the system clock of the BBU0.

Further, as shown in FIG. 6, the board in the BBU1 further includes an IEEE1588 boundary clock 704, a CPU 705, and a phase-locked loop—706 of an IEEE 1588 clock, where:

the interface chip—701 of the board in the BBU1 is further configured to receive the IEEE1588 clock packet transmitted by the interface chip—608 of the board in the BBU0, and output the IEEE1588 clock packet to the IEEE1588 boundary clock—704 of the board in the BBU1;

the IEEE1588 boundary clock—704 of the board in the BBU1 is configured to receive the IEEE1588 clock packet output by the interface chip—701 of the board in the BBU1, and output clock information to the CPU 705 of the board in the BBU1;

the CPU—705 of the board in the BBU1 is configured to receive the clock information output by the IEEE1588 boundary clock—704, and output a time adjusting value to the phase-locked loop—706 of the 1588 clock of the board in the BBU1;

the phase-locked loop—706 of the 1588 clock of the board in the BBU1 is configured to receive the time adjusting value output by the CPU—705 of the board in the BBU1, and output clock phase information of the BBU1 to the frequency division phase locker—703 of the board in the BBU1; and the frequency division phase locker—703 of the board in the BBU1 is configured to receive the clock phase information of the BBU1 output by the phase-locked loop—706 of the 1588 clock of the board in the BBU1, and perform locking on a phase of the BBU1, so as to implement time synchronization between the system clock of the BBU1 and the system clock of the BBU0.

Further, as shown in FIG. 6, the board in the BBU1 may further include a frequency division phase detector—707, an oven controlled crystal oscillator—708, and a selector—709, where:

the frequency division phase detector—707 of the board in the BBU1 is configured to receive a reference clock signal input by an external clock source, and input the reference clock signal into the oven controlled crystal oscillator—708 of the board in the BBU1, where the reference clock signal that is input by the external clock source and is received by the frequency division phase detector—707 of the board in the BBU1 is the same as the reference clock signal that is input by the external clock source and is received by the frequency division phase detector—601 of the board in the BBU0;

the oven controlled crystal oscillator—708 of the board in the BBU1 is configured to receive the reference clock signal input by the frequency division phase detector—707 of the board in the BBU1, and output a first clock to the selector—709 of the board in the BBU1; and the selector—709 of the board in the BBU1 is configured to receive the first clock output by the oven controlled crystal oscillator—708 of the board in the BBU1, and after receiving the synchronous Ethernet clock output by the interface chip—701 of the board in the BBU1, select the synchronous Ethernet clock (such as 25 MHz) for the frequency division phase locker—703 of the board in the BBU1.

In the embodiment of the present invention, if a standard is both a clock receiver between BBUs and a clock sender between the BBUs, for example, in a GUL triple-mode base station, the UMTS standard receives a clock sent by the GSM standard, and also sends the clock to the LTE standard. In this case, the UMTS standard functioning as an intermediate standard is required to send the same system clock to the VCXO and another standard. In this case, the selector in FIG. 6 plays this role.

In the embodiment of the present invention, a standard of the board in the BBU0 may be completely different from a standard of the board in the BBU1, so that the multimode base station can implement more different standards; or, in the embodiment of the present invention, the standard of the board in the BBU0 may be partially the same as the standard of the board in the BBU1, so that the multimode base station has backup of partial standards.

In the embodiment of the present invention, a multimode base station is at least integrated with a first baseband unit BBU0 and a second base band unit BBU1, and because a board in the BBU0 and a board in the BBU1 each are connected to a common-mode radio frequency module through a CPRI, the board in the BBU1 can implement frequency synchronization between a system clock of the board in the BBU1 and a system clock of the board in the BBU0 by using a synchronous Ethernet clock that is output by the board in the BBU0, and the board in the BBU1 can implement time synchronization between the system clock of the board in the BBU1 and the system clock of the board in the BBU0 by using an IEEE1588 clock that is output by the board in the BBU0, thereby implementing strict synchronization between the system clock of the board in the BBU0 and the system clock of the board in the BBU1 and enabling the multimode base station to support more standards.

A person of ordinary skill in the art may understand that all or a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), or a random access memory (Random Access Memory, RAM for short).

The foregoing disclosed descriptions are merely exemplary embodiments of the present invention, but are definitely not intended to limit the protection scope of the present invention. Therefore, any equivalent variation made according to the claims of the present invention shall fall within the scope of the present invention.

What is claimed is:

1. An implementation method of a multimode base station, wherein the multimode base station is at least integrated with a first baseband unit BBU0 and a second base band unit BBU1, wherein a board of at least one standard is overlaid in the BBU0 and the BBU1 each; and the board in the BBU0 and the board in the BBU1 each are connected to a common-mode radio frequency module through a communication interface, the method comprising:
   implementing, by a board in the BBU1, frequency synchronization between a system clock of the board in the BBU1 and a system clock of the board in the BBU0 by using a synchronous Ethernet clock that is output by a board in the BBU0; and
   implementing, by the board in the BBU1, time synchronization between the system clock of the board in the BBU1 and the system clock of the board in the BBU0 by using an IEEE1588 clock that is output by the board in the BBU0.

2. The method according to claim 1, wherein the method further comprises:
   receiving, by a frequency division phase detector of the board in the BBU0, a reference clock signal input by an external clock source, and inputting the reference clock signal into an oven controlled crystal oscillator OCXO of the board in the BBU0;
   outputting, by the OCXO of the board in the BBU0, a first clock to a voltage-controlled crystal oscillator VCXO of the board in the BBU0, wherein the VCXO of the board in the BBU0 outputs a second clock to a frequency division phase locker of the board in the BBU0, and precision of the second clock is higher than precision of the first clock;
   outputting, by the frequency division phase locker of the board in the BBU0, a system clock and phase information of the BBU0;
   outputting, by the OCXO of the board in the BBU0, the first clock to a phase-locked loop of a synchronous Ethernet clock of the board in the BBU0, wherein the phase-locked loop of the synchronous Ethernet clock outputs the synchronous Ethernet clock and transmits the synchronous Ethernet clock to the board in the BBU1 through an interface chip of the board in the BBU0; and
   performing, by a phase-locked loop of an IEEE 1588 clock of the board in the BBU0, phase lock processing on the phase information of the BBU0, and outputting the phase information of the BBU0 to an IEEE1588 boundary clock of the board in the BBU0; wherein the IEEE1588 boundary clock outputs an IEEE1588 clock packet and transmits the IEEE1588 clock packet to the board in the BBU1 through the interface chip of the board in the BBU0.

3. The method according to claim 2, wherein the implementing, by the board in the BBU1, frequency synchronization between a system clock of the board in the BBU1 and a system clock of the board in the BBU0 by using a synchronous Ethernet clock that is output by the board in the BBU0 comprises:
   receiving, by an interface chip of the board in the BBU1, the synchronous Ethernet clock transmitted by the interface chip of the board in the BBU0, and outputting the synchronous Ethernet clock to a VCXO of the board in the BBU1, wherein the VCXO of the board in the BBU1 outputs the second clock to a frequency division phase locker of the board in the BBU1; and
   outputting, by the frequency division phase locker of the board in the BBU1, a system clock and phase information of the BBU1, so as to implement frequency synchronization between the system clock of the BBU1 and the system clock of the BBU0.

4. The method according to claim 3, wherein the implementing, by the board in the BBU1, time synchronization between the system clock of the board in the BBU1 and the system clock of the board in the BBU0 by using an IEEE1588 clock that is output by the board in the BBU0 comprises:
   receiving, by the interface chip of the board in the BBU1, the IEEE1588 clock packet transmitted by the interface chip of the board in the BBU0, and outputting the IEEE1588 clock packet to an IEEE1588 boundary clock of the board in the BBU1;
   outputting, by the IEEE1588 boundary clock of the board in the BBU1, clock information to a central processing unit of the board in the BBU1, wherein the central processing unit outputs a time adjusting value to a phase-locked loop of an IEEE 1588 clock of the board in the BBU1; and
   outputting, by the phase-locked loop of the 1588 clock of the board in the BBU1, clock phase information of the BBU1 to the frequency division phase locker of the board in the BBU1, wherein the frequency division phase locker of the board in the BBU1 performs locking on a phase of the BBU1, so as to implement time synchronization between the system clock of the BBU1 and the system clock of the BBU0.

5. The method according to claim 1, wherein a standard of the board in the BBU0 is completely different from or partially the same as a standard of the board in the BBU1.

6. The method according to claim 2, wherein a standard of the board in the BBU0 is completely different from or partially the same as a standard of the board in the BBU1.

7. The method according to claim 3, wherein a standard of the board in the BBU0 is completely different from or partially the same as a standard of the board in the BBU1.

8. A multimode base station, wherein the multimode base station is at least integrated with a first baseband unit BBU0 and a second base band unit BBU1, wherein a board of at least one standard is overlaid in the BBU0 and the BBU1 each; and the board in the BBU0 and the board in the BBU1 each are connected to a common-mode radio frequency module through a common public radio interface, wherein:
   the board in the BBU0 is configured to output a synchronous Ethernet clock and an IEEE1588 clock to the board in the BBU1; and
   the board in the BBU1 is configured to implement frequency synchronization between a system clock of the board in the BBU1 and a system clock of the board in the BBU0 by using the synchronous Ethernet clock that is output by the board in the BBU0, and implement time synchronization between the system clock of the board in the BBU1 and the system clock of the board in the BBU0 by using the IEEE1588 clock that is output by the board in the BBU0.

9. The multimode base station according to claim 8, wherein the board in the BBU0 at least comprises a frequency division phase detector, an oven controlled crystal oscillator OCXO, a voltage-controlled crystal oscillator VCXO, a frequency division phase locker, a phase-locked loop of a synchronous Ethernet clock, a phase-locked loop of an IEEE 1588 clock, an EEE1588 boundary clock, and an interface chip, wherein:
- the frequency division phase detector of the board in the BBU0 is configured to receive a reference clock signal input by an external clock source, and input the reference clock signal into the oven controlled crystal oscillator OCXO of the board in the BBU0;
- the OCXO of the board in the BBU0 is configured to receive a reference clock signal input by the frequency division phase detector of the board in the BBU0, and output a first clock to the voltage-controlled crystal oscillator VCXO of the board in the BBU0;
- the VCXO of the board in the BBU0 is configured to receive the first clock output by the OCXO of the board in the BBU0, and output a second clock to the frequency division phase locker of the board in the BBU0, wherein precision of the second clock is higher than precision of the first clock;
- the frequency division phase locker of the board in the BBU0 is configured to receive the second clock output by the VCXO of the board in the BBU0, and output a system clock and phase information of the BBU0;
- the OCXO of the board in the BBU0 is further configured to output the first clock to the phase-locked loop of the synchronous Ethernet clock of the board in the BBU0;
- the phase-locked loop of the synchronous Ethernet clock of the board in the BBU0 is configured to receive the first clock output by the OCXO of the board in the BBU0, and output a synchronous Ethernet clock to the interface chip of the board in the BBU0;
- the interface chip of the board in the BBU0 is configured to transmit the synchronous Ethernet clock output by the phase-locked loop of the synchronous Ethernet clock of the board in the BBU0 to the board in the BBU1;
- the phase-locked loop of the 1588 clock of the board in the BBU0 is configured to perform phase lock processing on the phase information output by the frequency division phase locker of the board in the BBU0 and output the phase information to the IEEE1588 boundary clock of the board in the BBU0;
- the IEEE1588 boundary clock of the board in the BBU0 is configured to output an IEEE1588 clock packet to the interface chip of the board in the BBU0; and
- the interface chip of the board in the BBU0 is further configured to transmit the IEEE1588 clock packet output by the IEEE1588 boundary clock of the board in the BBU0 to the board in the BBU1.

10. The multimode base station according to claim 9, wherein the board in the BBU1 at least comprises an interface chip, a VCXO, and a frequency division phase locker, wherein:
- the interface chip of the board in the BBU1 is configured to receive a synchronous Ethernet clock transmitted by the interface chip of the board in the BBU0, and output the synchronous Ethernet clock to the VCXO of the board in the BBU1;
- the VCXO of the board in the BBU1 is configured to receive the synchronous Ethernet clock output by the interface chip of the board in the BBU1, and output the second clock to the frequency division phase locker of the board in the BBU1; and
- the frequency division phase locker of the board in the BBU1 is configured to receive the second clock output by the VCXO of the board in the BBU1, and output a system clock and phase information of the BBU1, so as to implement frequency synchronization between the system clock of the BBU1 and the system clock of the BBU0.

11. The multimode base station according to claim 10, wherein the board in the BBU1 further comprises an IEEE1588 boundary clock, a central processing unit, and a phase-locked loop of an IEEE 1588 clock, wherein:
- the interface chip of the board in the BBU1 is further configured to receive the IEEE1588 clock packet transmitted by the interface chip of the board in the BBU0, and output the IEEE1588 clock packet to the IEEE1588 boundary clock of the board in the BBU1;
- the IEEE1588 boundary clock of the board in the BBU1 is configured to receive the IEEE1588 clock packet output by the interface chip of the board in the BBU1, and output clock information to the central processing unit of the board in the BBU1;
- the central processing unit is configured to receive the clock information output by the IEEE1588 boundary clock, and output a time adjusting value to the phase-locked loop of the 1588 clock of the board in the BBU1;
- the phase-locked loop of the 1588 clock of the board in the BBU1 is configured to receive the time adjusting value output by the central processing unit, and output clock phase information of the BBU1 to the frequency division phase locker of the board in the BBU1; and
- the frequency division phase locker of the board in the BBU1 is configured to receive the clock phase information of the BBU1 output by the phase-locked loop of the 1588 clock of the board in the BBU1, and perform locking on a phase of the BBU1, so as to implement time synchronization between the system clock of the BBU1 and the system clock of the BBU0.

12. The multimode base station according to claim 8, wherein a standard of the board in the BBU0 is completely different from or partially the same as a standard of the board in the BBU1.

13. The multimode base station according to claim 9, wherein a standard of the board in the BBU0 is completely different from or partially the same as a standard of the board in the BBU1.

14. The multimode base station according to claim 10, wherein a standard of the board in the BBU0 is completely different from or partially the same as a standard of the board in the BBU1.

15. The multimode base station according to claim 11, wherein a standard of the board in the BBU0 is completely different from or partially the same as a standard of the board in the BBU1.

\* \* \* \* \*